Patented Jan. 9, 1951

2,537,015

UNITED STATES PATENT OFFICE 2,537,015

PROCESS FOR POLYMERIZING UNSATURATED COMPOUNDS

Gerald R. Barrett, Winchester, Mass., assignor to Monsanto Chemical Company, St. Louis, Mo., a corporation of Delaware No Drawing. Application December 28, 1946, Serial No. 719,134

8 Claims. (Cl. 260—78.5)

The present invention relates to the polymerization of unsaturated organic compounds, and more particularly to the polymerization of unsaturated organic compounds wherein the polymerization is effected by a free radical mechanism reaction being initiated by heat, light or by the presence of a catalytic material capable of furnishing a free radical, such as, for example, peroxides.

In the polymerization of unsaturated compounds it is generally desirable to control the polymerization rate so that the reaction is controlled without the danger of runaway reaction rates and that the product possesses a lower average molecular weight, as gauged by viscosity of solution, than would otherwise be obtainable.

Considerable theory has been well developed concerning the reaction rates in the polymerization of unsaturated organic compounds and on the simultaneous effect on molecular size of the products. Thus, there may be cited in this connection, Mark and Raff—"High Polymeric Reactions," Interscience Publishers, 1941 edition; "Collected Papers on High Polymers," Annals of the New York Academy of Sciences, vol. XLIV, Article 4, 263–443.

According to one accepted view, the over-all rate in polymerization reactions is the resultant of three consecutive reactions, namely, (1) activation; (2) chain growth; (3) chain termination. The chain growth reaction is rapid compared with the other steps so that in general the reaction rate is more dependent on the relative rates of chain initiation (the activation step) and chain termination than on the second step. There is a wide variation between different polymerizable compounds in this respect, and with a given compound or mixture of compounds by suitable control of temperatures and environment the relative rates of reactions (1) and (3) may be altered. In so far as the relative effect on rate and degree of polymerization (i. e., chain length and, proportional to this, molecular weight of the polymer) is concerned, reaction (3), considering a single growing chain, may take the form of a "chain transfer" reaction in which the chain terminates its growth but at the same time transfers its energy to a new system, which grows in turn by process (2). To the extent that "chain transfer" rather than real "chain termination" occurs, there may be a marked effect on the polymer size without any corresponding diminution of reaction rate.

It is generally known that the addition of certain materials may influence polymerization by their effects in the initiation and termination process. Considering the initiation step, it is common practice to add organic peroxides which act as initiators of polymerization. Reaction rate and molecular weight are affected by the amount of catalyst used. Other materials have a pronounced effect on the termination reaction. Carbon tetrachloride and organic mercaptans have been listed heretofore in the literature as chain transfer aids. It is also known that aromatic compounds containing nuclear nitro substituents have a certain effect in reducing reaction rate and lowering the degree of polymerization, and aldehydes have been similarly employed. The use of the above classes of compounds in general leave much to be desired. Thus, the aromatic compounds containing nuclear nitro substituents are not of sufficient activity to be satisfactorily employed in the polymerization of most unsaturated compounds, for example, vinyl compounds such as styrene and its copolymers.

An object of this invention is to provide a process for controlling the polymerization of unsaturated organic compounds.

Another object is to provide a controller for polymerization processes.

Other and further objects will be apparent as herein disclosed.

In accordance with the present invention, there is employed in the polymerization of unsaturated compounds a proportion of a compound possessing the structural formula $R_1CH=C(R_2)NO_2$, in which $R_1$ is an aromatic radical and $R_2$ is hydrogen or a monovalent hydrocarbon radical. Such compounds in general are obtainable by reaction of an aromatic aldehyde with an alkyl or aralkyl nitro compound. Thus, for example, benzaldehyde is reacted with nitro methane to give β nitro styrene also known as 1 phenyl, 2 nitro ethylene, as shown below:

The reaction may be carried out in one step using an aliphatic amine such as methyl or amyl amine as the condensing agent. Or the reaction may be carried out in two steps using an alkali as condensing agent as shown below:

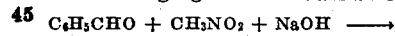

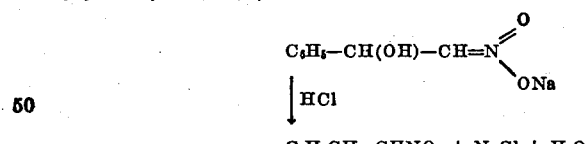

Included within, and exemplary of the preferred class of retarders are 1 phenyl, 2 nitro ethylene; 1 phenyl, 2 methyl, 2 nitro ethylene; 1 vanillyl, 2 nitro ethylene; 1 anisyl, 2 nitro ethylene and 1 o-chlor phenyl, 2 nitro ethylene. All of these compounds exhibit desirable retarding properties when employed in the polymerization of unsaturated compounds. It is also possible to use 1 furyl, 2 nitro ethylene instead of the aromatic compounds mentioned above.

The following are given by way of specific examples illustrating the invention, but are to be understood as not limiting the scope thereof.

*Example I*

Several reaction vessels (dia. 20 mm.) each containing a solution of 4.8 g. maleic anhydride dissolved in 5.2 g. styrene, and containing additionally varying amounts of 1 phenyl, 2 nitro ethylene ($\beta$ nitro styrene), tightly closed after flushing with nitrogen and provided with a thermometer well (dia. 9 mm.) and thermometer, were heated separately in an oven provided with forced air circulation for good temperature control. For each run the oven temperature was kept as nearly as possible at a temperature so that the well thermometer, during the period of reaction, registered a temperature 5° C. hotter than the oven temperature, the latter varying from 40°–85° C. as the $\beta$ nitro styrene content was raised progressively to 1% of the weight of styrene plus maleic anhydride. Reaction was fairly complete in 6 hours in each case and was pushed to substantial completion by heating for several hours additionally at 125° C.

Comparative molecular weights of the products expressed as relative viscosities of 2% solution in acetone, with the control run without $\beta$ nitro styrene rated at 100, are as follows:

| Per cent nitro styrene | Viscosity |
| --- | --- |
| 0.00 | 100 |
| .02 | 80 |
| .05 | 66 |
| .10 | 53 |
| .50 | 28 |
| 1.00 | 18 |

*Example II*

A similar run to that of Example I, wherein 1 furyl, 2 nitro ethylene in an amount equal to 0.1% on the combined weight of styrene and maleic anhydride was employed as the retarder, produced a product with a viscosity rating of 26.

*Example III*

Similar runs with styrene, containing 0.1% benzoyl peroxide as polymerization catalyst, were made with and without 0.1% $\beta$ nitro styrene modifier. The comparative viscosities of 2% solutions in benzol were 26 and 30, respectively, on the same scale as above.

*Example IV*

Similar runs with methyl acrylate, containing 0.2% benzoyl peroxide catalyst, with and without 0.05 $\beta$ nitro styrene, gave products which as 2% solutions in acetone had viscosities of 91 and 480, respectively.

*Example V*

Runs were carried out wherein 0.1% each of 1 vanillyl, 2 nitro ethylene; 1 anisyl, 2 nitro ethylene and 1 o-chlor phenyl, 2 nitro ethylene were employed as retarders of polymerization in conjunction with styrene-maleic anhydride in a manner analogous to that of Example I. Reaction and viscosity effects similar to those employing $\beta$ nitro styrene were obtained.

As further specific examples of the present invention, styrene and its substitution products are reacted with monofunctional alkyl half esters such as the secondary butyl, the methyl amyl, the isopropyl and the secondary octyl half esters of maleic, fumaric, citraconic, phenyl maleic, benzyl maleic and ethyl maleic acids in the presence of $\beta$ nitro styrene as controllers of polymerization. Such compounds are disclosed and claimed in my copending application Serial No. 719,136 filed Dec. 28, 1946, now abandoned.

Further examples of unsaturated organic compounds with which the nitro compounds of this invention are employable will be apparent to those skilled in the art, including preferably the styrenes and their copolymers, acrylates and the like.

From the above it will be apparent that the nitro substituted compounds of this invention comprise an important group of retarders or controllers of polymerization of unsaturated compounds such as, for example, vinyl compounds.

The control of the over-all rate of polymerization is of especial importance when polymerization is carried out in thick masses in the absence of solvent or emulsifier. Under such conditions it is necessary that the reaction temperature be held at such a state that the heat of polymerization be dissipated at a controllable rate without excessive differential between the center of the mass and the outer dissipating surfaces. The effects of the compounds of the invention are many in assisting temperature control and the production of low molecular weight products. Thus, by retarding the over-all rate of polymerization they permit the use of higher reaction temperatures for a given rate of polymerization. Again, for any temperature of polymerization the presence of the compounds of the present invention produces polymers of lower molecular weight than without them. Further, by favoring low molecular weight and by operation at higher temperature the employ of compounds of the present invention permits reaction or polymerization to a state where a considerable amount of monomer is reacted before the mass is set to a rigid gel, in which state the removal of heat by convection, rather than by conduction and radiation, is substantially impossible. This is due to the fact that both low molecular weight and high temperature tend to produce viscosity reduction. Prolongation of the time at which the polymer mass remains fluid thus assists temperature control over a longer interval, and at the same time carries the reaction further along, the reaction potential being diminished so that dangerously fast reaction becomes substantially eliminated. Again, in the polymerization of some unsaturated compounds, the polymer may be soluble only to a limited extent in the monomer; for example, this is the case in the copolymerization of styrene with maleic anhydride. In the copolymerization of styrene with maleic anhydride there is a tendency for the separation of the polymer as a gel, swollen by the monomers but not completely soluble in the total mix. Faster reaction rate and more difficult removal of heat exist in the gel than in the fluid region of the mass so that for controllable temperatures in the gel region there is an accompanying slow reaction for the sol portion with a prolongation of the total reaction time. Furthermore, and in particular, in the case of the copolymerization of styrene with maleic anhydride, the polymer gel may be swollen by the separate monomers in different proportions than those in which they tend to combine in the polymer, thus tending to produce a non-uniform polymer. A rise of temperature and low molecular weight tend to suppress gel separation. In consequence, the employ of the nitro substituted compounds of the present invention promotes uniformity of polymer.

In the production of thick masses of polymer and in production of a medium, rather than a very low molecular weight polymer, wherein it frequently is not desirable to employ a temperature sufficiently high to prevent gel separation, it is desirable to assist retention of a single phase by addition of a small amount of a good polymer solvent such as, for example, acetone where the polymer comprises styrene-maleic anhydride. Other solvents may be used for different polymeric substances.

It, furthermore, in the polymerization of unsaturated compounds, is frequently desirable to combine the action of the chain-terminating agent, that is, the nitro compounds of this invention, with a small proportion of a chain-transfer agent such as a mercaptan, for example, dodecyl mercaptan.

The amounts of nitro substituted compounds of this invention employed in the polymerization of unsaturated compounds may be varied considerably depending to some extent on the polymerizing substances with which it is used. Generally, there may be used amounts varying between about 0.01% to 1.0% on the weight of the polymerizing substances. In the employ of $\beta$ nitro styrene an amount varying between about 0.02% to 0.50% on the weight of the polymerizing substances has been found to be especially useful.

The nuclear nitro substituted aromatic compounds are in general not nearly as efficient as retarders of polymerization as are the compounds of the class embraced by the formula $$R_1CH=C(R_2)NO_2$$

in which $R_1$ is an aromatic radical, and $R_2$ is a hydrogen or a monovalent hydrocarbon radical and, moreover, such compounds as di-nitro benzene and di-nitro naphthalene and the like are color producing under the conditions of use. Thus, their use is exceedingly limited.

What is claimed is:

1. A process of polymerizing polymerizable unsaturated compounds selected from the group consisting of styrene, methyl acrylate and mixtures of styrene with unsaturated compounds selected from the group consisting of maleic anhydride and the mono-functional alkyl half esters of maleic, fumaric, citraconic, phenyl maleic, benzyl maleic and ethyl maleic acids which comprises incorporating therewith from 0.01 to 1.0%, on the weight of said compounds, of a compound possessing the structural formula:

$$R_1—CH=C(R_2)NO_2$$

in which $R_1$ is selected from the group consisting of aromatic radicals and the furyl radical and $R_2$ is selected from the group consisting of hydrogen and methyl, and reacting and thereby polymerizing said compounds.

2. A process of polymerizing styrene-containing compounds which comprises incorporating therewith from 0.01 to 1.0%, on the weight of said compound, of a compound possessing the structural formula: $R_1—CH=C(R_2)NO_2$, in which $R_1$ is selected from the group consisting of aromatic radicals and the furyl radical and $R_2$ is selected from the group consisting of hydrogen and methyl, and reacting and thereby polymerizing said styrene-containing compounds.

3. A process of polymerizing a composition comprising styrene and maleic anhydride which comprises incorporating therewith from 0.01 to 1.0%, on the weight of said styrene and maleic anhydride, of a compound possessing the structural formula: $R_1—CH=C(R_2)NO_2$, in which $R_1$ is selected from the group consisting of aromatic radicals and the furyl radical and $R_2$ is selected from the group consisting of hydrogen and methyl, and reacting and thereby polymerizing said composition.

4. A process of polymerizing a composition comprising styrene and maleic anhydride which comprises incorporating therewith from 0.01 to 1.0%, on the weight of said styrene and maleic anhydride, of $\beta$ nitro styrene, and reacting and thereby polymerizing said composition.

5. A process of polymerizing a composition comprising styrene and maleic anhydride which comprises incorporating therewith from 0.01 to 1.0%, on the weight of said styrene and maleic anhydride, of 1-furyl, 2 nitro ethylene, and reacting and thereby polymerizing said composition.

6. A process of polymerizing a composition comprising styrene and maleic anhydride which comprises incorporating therewith from 0.01 to 1.0%, on the weight of said styrene and maleic anhydride, of 1 o-chlor. phenyl, 2 nitro ethylene, and reacting and thereby polymerizing said composition.

7. A process of polymerizing polymerizable unsaturated compounds selected from the group consisting of styrene, methyl acrylate and mixtures of styrene with unsaturated compounds selected from the group consisting of maleic anhydride and mono-functional alkyl half esters of maleic, fumaric, citraconic, phenyl maleic, benzyl maleic and ethyl maleic acids, which comprises incorporating therewith (1) from 0.01 to 1.0%, on the weight of said compounds, of a compound possessing the structural formula: $R_1—CH=C(R_2)NO_2$, in which $R_1$ is selected from the group consisting of aromatic radicals and the furyl radical and $R_2$ is selected from the group consisting of hydrogen and methyl, and (2) a small proportion of dodecyl mercaptan, and reacting and thereby polymerizing said compounds.

8. A process of polymerizing a composition comprising styrene and maleic anhydride which comprises incorporating therewith from 0.01 to 1.0%, on the weight of said styrene and maleic anhydride, of $\beta$ nitro styrene and a small proportion of dodecyl mercaptan, and reacting and thereby polymerizing said composition.

GERALD R. BARRETT.

REFERENCES CITED

The following references are of record in the file of this patent:

UNITED STATES PATENTS

| Number | Name | Date |
| --- | --- | --- |
| 2,262,002 | Hopff et al. | Nov. 11, 1941 |
| 2,274,551 | Kenyon et al. | Feb. 24, 1942 |
| 2,359,103 | Gerhart et al. | Sept. 26, 1944 |

OTHER REFERENCES

Richter's Organic Chemistry, vol. II (1922), page 27.

Fuson and Snyder: Organic Chemistry (1942), N. Y., page 44.